United States Patent
Burton et al.

[11] Patent Number: 5,342,015
[45] Date of Patent: Aug. 30, 1994

[54] APPARATUS FOR MOUNTING REAR VIEW MIRRORS ON A TRACTOR

[75] Inventors: Paul Burton, Lee, Ill.; Steven D. Brownlee, c/o Farmer's Factory Co, County Line Rd. South Box 122, Lee, Ill. 60530

[73] Assignees: Steven Brownlee, Amboy, Ill.; Farmer's Factory Company, Lee, Ill.

[21] Appl. No.: 59,298

[22] Filed: May 11, 1993

[51] Int. Cl.$^5$ .............................. B60R 1/02
[52] U.S. Cl. .................... 248/478; 248/479; 248/480; 248/285; 248/289.3; 359/871; 403/111
[58] Field of Search ............ 248/549, 578, 466, 475.1, 248/476, 477, 478, 479, 480, 900, 289.1, 289.3, 285; 359/871, 872; 403/83, 110, 111, 166

[56] References Cited

U.S. PATENT DOCUMENTS

| | | |
|---|---|---|
| 2,241,866 | 5/1941 | Needham . |
| 2,483,289 | 9/1949 | Martin . |
| 3,305,202 | 2/1967 | Christenson . |
| 3,390,937 | 7/1968 | Nicholson . |
| 3,433,448 | 3/1969 | Weber .................. 248/476 |
| 3,481,574 | 12/1969 | Willaman . |
| 3,937,563 | 2/1976 | Frabe . |
| 4,186,905 | 2/1980 | Brudy .................. 248/478 |
| 4,335,862 | 6/1982 | Sherman ............. 248/478 X |
| 5,044,596 | 9/1991 | de Espirito Santo ....... 248/900 X |
| 5,161,769 | 11/1992 | Coulthand ............. 248/900 X |

FOREIGN PATENT DOCUMENTS

| | | | |
|---|---|---|---|
| 866067 | 3/1971 | Canada ................. 248/480 |
| 410587 | 1/1991 | European Pat. Off. ...... 248/478 |
| 1237231 | 6/1960 | France ................. 248/289.3 |

OTHER PUBLICATIONS

Sketch of prior art tractor mirrors bearing Michael C. Payden's date stamp of Aug. 5, 1993.

Primary Examiner—David A. Scherbel
Assistant Examiner—Derek J. Berger
Attorney, Agent, or Firm—Leydig, Voit & Mayer

[57] ABSTRACT

Rear view mirrors for a tractor are mounted on elongated arms which may be adjusted laterally to change the lateral spacing between the mirrors and the tractor, which automatically swing rearwardly or forwardly upon striking an obstruction, and which may be quickly and easily folded to and held in a compact storage position extending longitudinally of the tractor.

13 Claims, 3 Drawing Sheets

APPARATUS FOR MOUNTING REAR VIEW MIRRORS ON A TRACTOR

BACKGROUND OF THE INVENTION

This invention relates generally to rear view mirrors and, more particularly, to outrigger rear view mirrors for tractors or similar agricultural vehicles in order to enable the driver to see around large trailing implements.

In the past, Farmer's Factory Company has made and sold rear view mirror apparatus in which a laterally extending mounting bar or tube is attached to the roof of the tractor. Mirror supporting arms telescoped into the mounting tube extend laterally outwardly from the tractor and carry rear view mirrors which are spaced a substantial distance outboard of the tractor. By adjusting the arms back and forth within the tube, the lateral spacing between the mirrors and the tractor may be selectively increased or decreased.

In prior mirror arrangements of this type, the mirrors, the supporting arms, the mounting tube and/or the tractor roof may be subjected to damage if the long arms strike a rigid obstruction. Moreover, it is necessary to slide the arms inwardly to their fullest extent in order to allow the tractor to move through narrow passageways. Subsequently, the arms must be re-adjusted to locate the mirrors in their original positions.

SUMMARY OF THE INVENTION

The general aim of the present invention is to provide new and improved tractor rear view mirror supporting apparatus which, while still permitting lateral adjustment of the mirrors through a wide range, enables the mirror supporting arms to automatically pivot upon striking an obstruction so as to reduce the danger of the obstruction causing damage to the mirrors, the arms and other components.

A further object of the invention is to provide apparatus in which the mirror supporting arms may be quickly and easily folded to compactly stored positions and then quickly and easily unfolded to locate the mirrors in the same positions they occupied prior to storage.

The invention also resides in the provision of relatively simple and inexpensive mechanism for mounting the mirror supporting arms for inward and outward adjustment, for automatic pivoting upon striking an obstruction, and for quick and easy folding to and unfolding from storage positions.

These and other objects and advantages of the invention will become more apparent from the following detailed description when taken in conjunction with the accompanying drawings.

DETAILED DESCRIPTION OF THE PREFERRED EMBODIMENT

Figure 1:
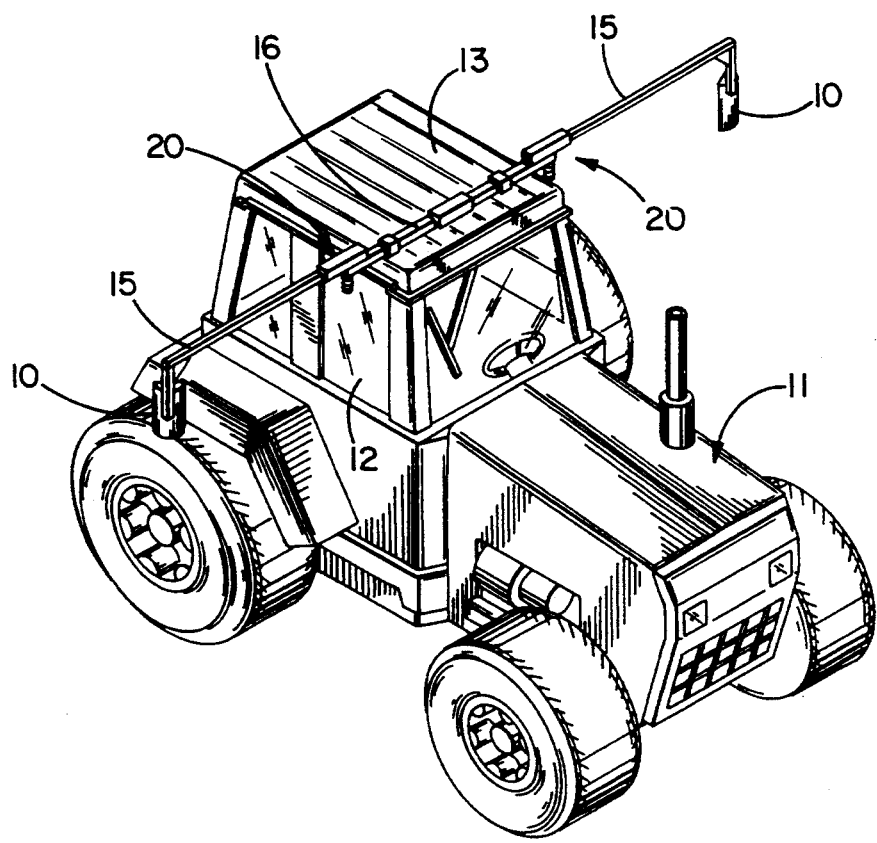
FIG. 1 is a front perspective view of a typical tractor equipped with new and improved rear view mirror apparatus incorporating the unique features of the present invention.

For purposes of illustration, the invention has been shown in the drawings as embodied in apparatus for mounting a pair of rear view mirrors 10 on an agricultural vehicle such as a tractor 11 having an operator's cab 12 with a roof 13. The mirrors are carried on the outer ends of elongated support arms 15 and enable the operator to gain a clear view behind a relatively tall and/or wide trailing implement being towed by the tractor.

Figure 2:
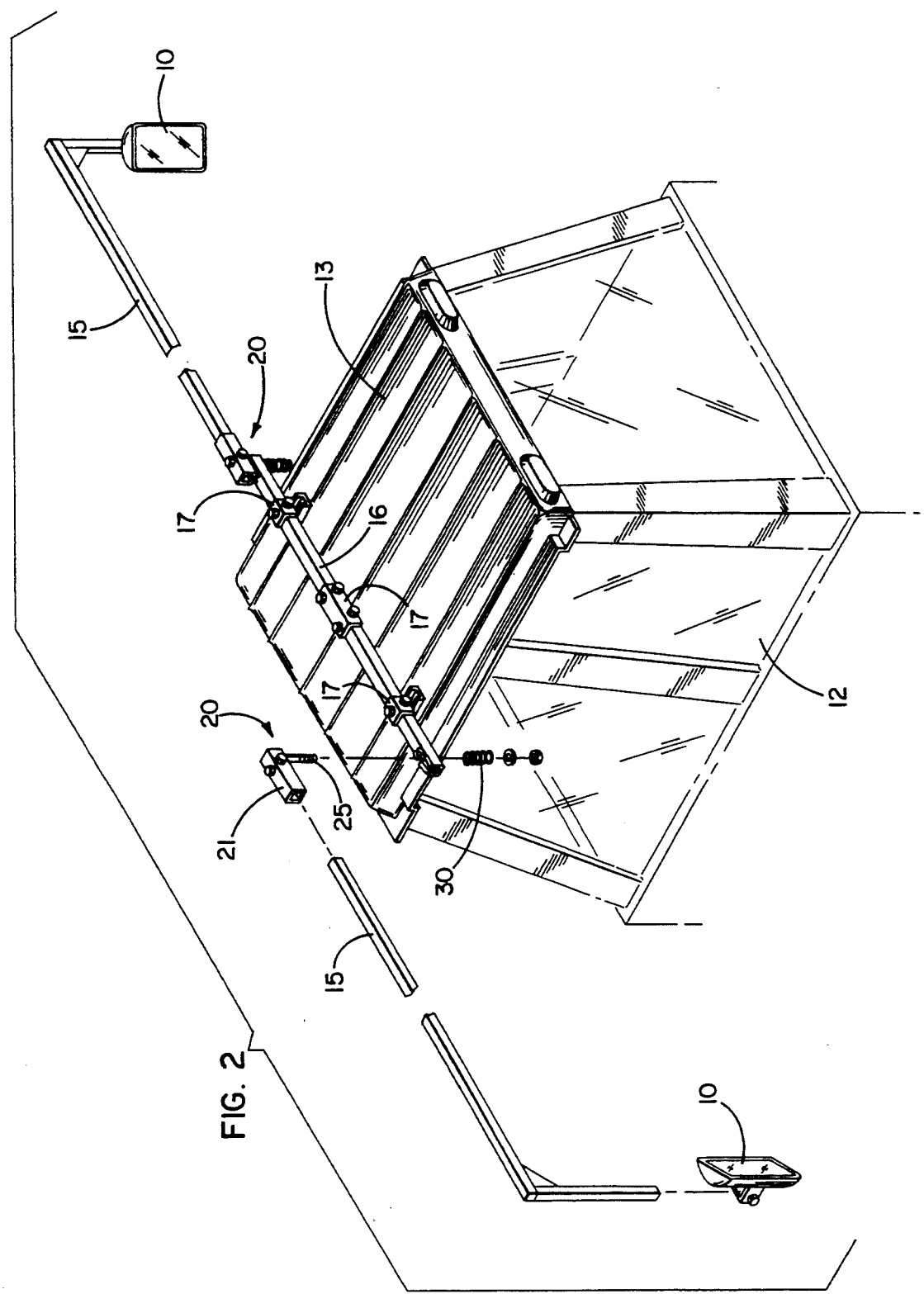
FIG. 2 is an enlarged rear perspective view, partially exploded, of the rear view mirror apparatus of the invention.

The support arms 15 are rectangular in cross-section and are attached to the tractor 11 by a mounting bar 16 which preferably but not necessarily is formed by a rectangular tube. The mounting bar 16 extends transversely across the cab roof 13 near the front thereof and its end portions project laterally outwardly a short distance beyond the sides of the cab 12. Suitable brackets 17 (FIG. 2) attach the bar 16 rigidly to the roof 13.

In accordance with the present invention, the support arms 15 are attached to the bar 16 by extremely simple mounting units 20 which enable the arms to pivot either forwardly or rearwardly upon hitting an obstruction, which enable the arms to be quickly and easily folded to and unfolded from a compact storage position, and which enable the arms to be adjusted laterally inwardly and outwardly in order to adjust the lateral distance between the mirrors 10 and the cab 12. Herein, the two mounting units 20 are identical and thus a description of one will suffice for both.

Figure 3:
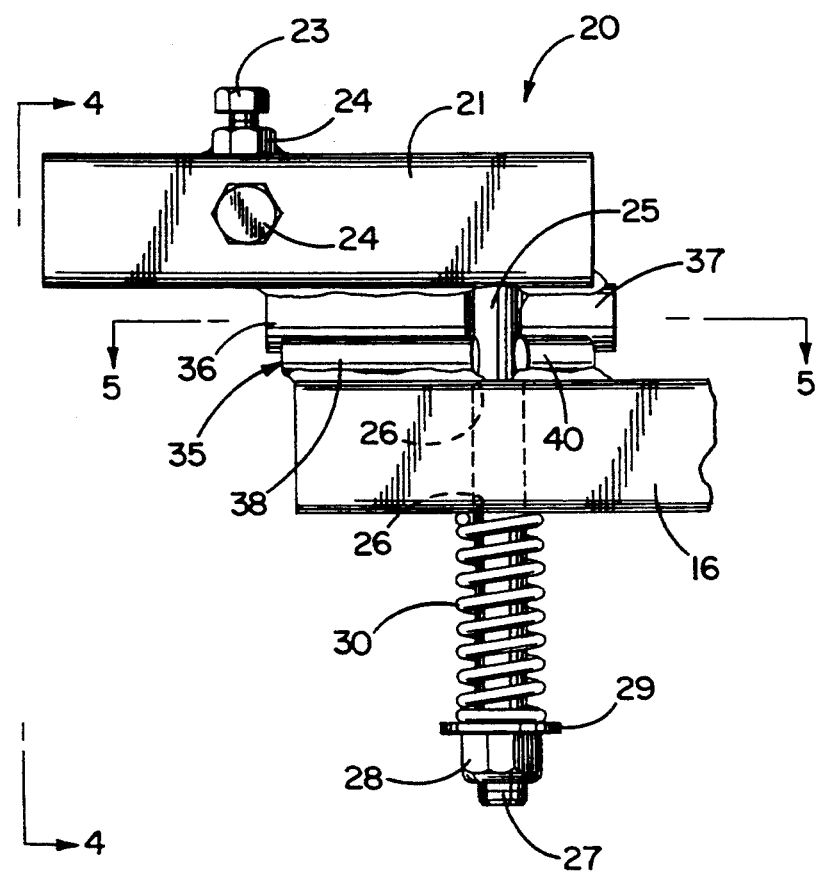
FIG. 3 is an enlarged front elevational view of a mechanism for mounting one of the mirror supporting arms.
Figure 4:
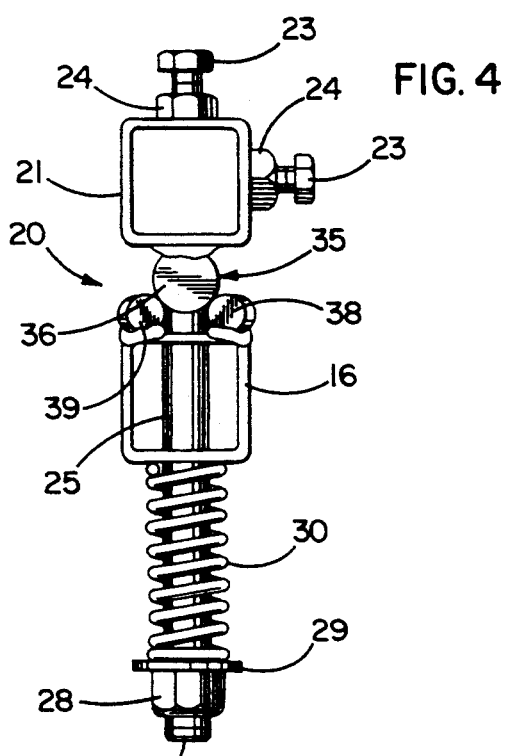
FIG. 4 is an end view of the mounting mechanism as seen along the line 4—4 of FIG. 3.
Figure 5:
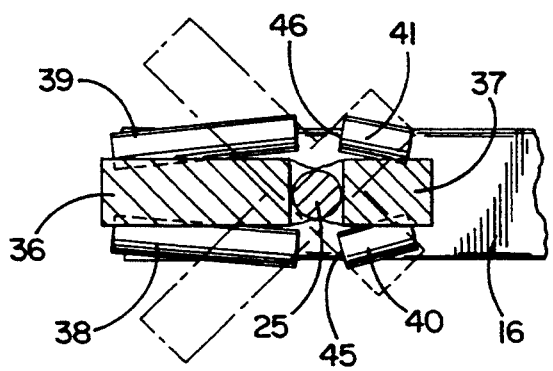
FIG. 5 is a fragmentary cross-section taken substantially along the line 5—5 of FIG. 3.
Figure 6:
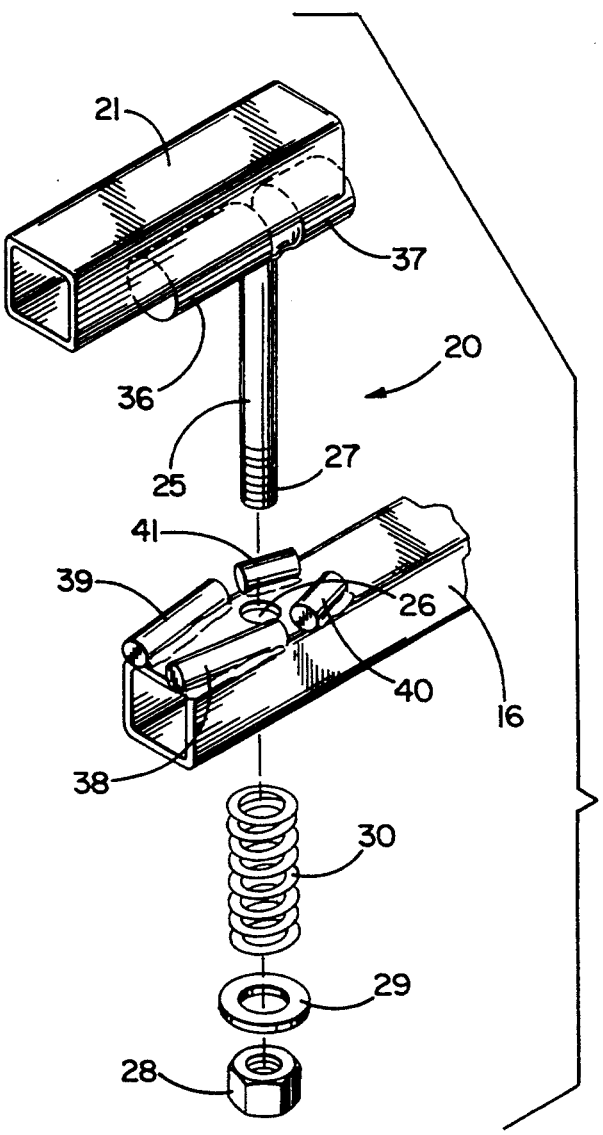
FIG. 6 is an exploded perspective view of the mounting mechanism shown in FIG. 3.

As shown most clearly in FIGS. 3, 5 and 6, each mounting unit 20 comprises a short tube 21 of rectangular cross-section. The support arm 15 is telescoped slidably into the tube 20 and, by sliding the arm inwardly and outwardly within the tube, the lateral spacing between the mirror 10 and the cab 12 may be set at a preselected distance. Once the arm has been appropriately adjusted within the tube, it is releasably locked in its adjusted position by a pair of set screws 23 (FIG. 4) which are threaded into nuts 24 welded to the tube.

As shown most clearly in FIG. 3, the inner end portion of the tube 21 is spaced vertically from the outer end portion of the bar 16. In carrying out the invention, a round shaft 25 is welded to and depends from the underside of the tube and extends downwardly through vertically aligned holes 26 in the outer end portion of the bar 16. The lower end portion of the shaft is threaded as indicated at 27 and supports a nut 28 and a washer 29, the latter defining a shoulder on the shaft. For a purpose to be explained subsequently, a coil spring 30 is telescoped over the lower end portion of the shaft 25 and is compressed between the washer 29 and the underside of the bar 16.

Further in carrying out the invention, detents 35 are sandwiched between the outer end portion of the bar 16 and the inner end portion of the tube 21. The detents normally hold the tube and the attached support arm 15 in a position perpendicular to the cab 12 but permit the tube and the arm to pivot about the axis of the shaft 25 in the event the arm strikes an obstruction.

In the present instance, the detents 35 comprise first and second upper detents 36 and 37 in the form of relatively large diameter cylindrical rods. The rods 36 and 37 are welded to the lower side of the tube 21 and are located on opposite sides of the shaft 25, the outer rod 36 being about twice as long as the inner rod 37. The axes of the rods 36 and 37 extend parallel to the axis of the tube 21.

The detents 35 further comprise first, second, third and fourth lower detents 38, 39, 40 and 41. These detents also are in the form of cylindrical rods but are substantially smaller in diameter than the rods 36 and 37. The rods 38 and 39 are welded to the upper side of the bar 16 adjacent the outer side of the shaft 25 while the rods 40 and 41 are welded to the upper side of the bar adjacent the inner side of the shaft. The outer rods 38 and 39 are about twice as long as the inner rods 40 and 41 and are positioned on the bar so as to converge toward one another as they progress outwardly from the shaft. The rods 40 and 41 also converge toward one another as they progress inwardly away from the shaft.

With the foregoing arrangement, the tube 21 normally is positioned such that the upper detent rod 36 is cradled between the outer end portions of the lower detent rods 38 and 39 and such that the upper detent rod 37 is cradled between the inner end portions of the lower detent rods 40 and 41 as shown in solid lines in FIG. 5. When the nut 28 is tightened, the spring 30 acts against the washer 29 and the nut and forces the shaft 25 downwardly so as to clamp the upper rod 36 against the outer end portions of the lower rods 38 and 39 and to clamp the upper rod 37 against the inner end portions of the lower rods 40 and 41. As a result, the tube 21 is restricted against turning about the axis of the shaft 25 and thus the support arm 15 is held substantially perpendicular to the cab 12.

If the tractor 11 is moving forwardly and the arm 15 strikes an obstruction, the rearward force applied to the arm causes the rods 36 and 37 to cam against the rods 39 and 40, respectively. As the rods 36 and 37 cam against the rods 39 and 40, the spring 30 yields to enable the tube 21 to move upwardly and thereby enable the rods 36 and 37 to move upwardly over the rods 39 and 40, respectively. This enables the arm 15 and the tube 21 to swing rearwardly about the axis of the shaft 25 and thereby eliminate or reduce damage to the arm, the tube, the bar 16 and/or the cab roof 13. In a similar manner, if the arm 15 hits an obstruction while the tractor is moving rearwardly, the rods 36 and 37 cam past and over the rods 38 and 41, respectively, to permit forward swinging of the arm. By loosening the nut 28, the preload of the spring 30 may be reduced to enable the arm 15 to swing free upon being subjected to smaller forces.

Once the obstruction has been cleared, the arm 15 may be restored to its original position simply by swinging the arm manually until the rods 36 and 37 are once again cradled between the rods 38, 39 and 40, 41, respectively. If the spring 30 is under a high preload, the nut 28 may be loosened to facilitate manual restoration of the arm.

Advantageously, a notch 45 (FIG. 5) is defined between adjacent ends of the spaced lower rods 38 and 40 while a similar notch 46 is defined between adjacent ends of the spaced lower rods 39 and 41. By manually swinging the arm 15 rearwardly through 90 degrees, the rods 36 and 37 detent into the notches 46 and 45, respectively, and hold the arm in a compactly stored position extending longitudinally of the tractor 11. This allows the tractor to be moved through narrow passages without interference from the arm. When the arm is swung forwardly and restored to its active position, the mirror 10 is spaced the same lateral distance from the tractor as was the case prior to storage and thus there is no need to re-adjust the lateral position of the mirror if the same implement is being towed.

Because the upper rods 36 and 37 only engage the end portions of the lower rods 38, 39 and 40, 41, respectively, when the arm 15 is extending laterally, the rods 38 and 39 are adequately detented and yet are capable of releasing when the arm strikes an obstruction. Moreover, contact between the upper and lower rods is minimized so as to reduce vibration imparted to the mirror 10. The converging relationship between the rods 38 and 39 and the rods 40 and 41 insures that the upper rods only contact the end portions of the lower rods and, at the same time, avoids the need for extreme positioning accuracy when the lower rods are welded to the mounting bar 16. By virtue of the outer rods 36, 38 and 39 being relatively long, they are capable of supporting the weight of the cantilevered arm 15. Not being required to support as heavy a load, the inner rods 37, 40 and 41 may be shorter so as to result in a saving of material.

We claim:

1. Rear view mirror apparatus for a roofed tractor or the like, said apparatus comprising mounting bar means adapted to be secured to the roof of the tractor and having portions projecting laterally from opposite sides of the roof, a laterally extending tube disposed in vertically spaced relation with each mounting bar portion, elongated mirror supporting arms each having an inboard end portion telescoped slidably into each tube and having an outboard end portion, a rear view mirror secured to the outboard end portion of each supporting arm, means for locking each supporting arm in its respective tube and selectively releasable to permit the supporting arm to slide inwardly and outwardly within the tube and thereby enable adjustment of the lateral spacing of the mirror from the tractor, and means interconnecting each tube and the respective mounting bar portion, said interconnecting means normally locking each tube to the respective mounting bar portion but yielding and permitting the tube to swing either forwardly or rearwardly relative to the mounting bar portion when a forward or rearward force exceeding a predetermined magnitude is exerted on the respective mirror supporting arm.

2. Apparatus as defined in claim 1 in which each of said interconnecting means comprises a shaft projecting vertically from one of said tube and said mounting bar portion and rotatably received in a hole in the other of said tube and said mounting bar portion, coacting detents on each tube and the respective mounting bar portion, and spring means normally causing said detents to interlock and prevent swinging of each tube about the axis of the respective shaft, said spring means yielding and permitting release of said detents and swinging of said tube about the axis of said shaft when a forward or rearward force exceeding a predetermined magnitude is exerted on the respective mirror mounting arm.

3. Apparatus as defined in claim 2 in which each tube is spaced above its respective mounting bar portion, said detents being sandwiched between said tube and said mounting bar portion.

4. Apparatus as defined in claim 3 in which each shaft is secured to and projects downwardly from the respective tube, each hole being in the respective mounting bar portion and rotatably receiving said shaft.

5. Apparatus as defined in claim 4 in which each shaft projects downwardly beyond the respective mounting bar portion and has a lower end portion with a shoulder, each spring means comprising a coil spring telescoped over said shaft and compressed between said mounting bar portion and said shoulder.

6. Apparatus as defined in claim 5 in which the lower end portion of each shaft is threaded, said shoulder comprising a washer encircling the lower end of each shaft and bearing against the lower end of the respective spring, and a nut threaded onto the lower end of each shaft and bearing against the respective washer, said nut being adjustable to vary the preload of said spring.

7. Apparatus as defined in claim 4 in which said detents comprise a first upper rod secured to the lower side of the respective tube and located adjacent one side of said shaft, said detents further comprising first and second lower rods secured to the upper side of the respective mounting bar portion and located adjacent said one side of said shaft, said first upper rod normally being cradled between said first and second lower rods.

8. Apparatus as defined in claim 7 in which said first upper rod extends laterally in the same direction as said tube, said first and second lower rods converging toward one another as such rods progress laterally away from said shaft.

9. Apparatus as defined in claim 7 in which said detents comprise a second upper rod secured to the lower side of the respective tube and located adjacent the opposite side of said shaft, said detents further comprising third and fourth lower rods secured to the upper side of the respective mounting bar portion and located adjacent said opposite side of said shaft, said second upper rod normally being cradled between said third and fourth lower rods.

10. Apparatus as defined in claim 9 in which said second upper rod extends in the same direction as said tube, said third and fourth lower rods converging toward one another as such rods progress laterally away from said shaft.

11. Apparatus as defined in claim 10 in which said first upper rod extends laterally in the same direction as said tube, said first and second lower rods converging toward one another as such rods progress laterally away from said shaft.

12. Apparatus as defined in claim 9 in which said first upper rod is longer than said second upper rod, said first and second lower rods being longer than said third and fourth lower rods.

13. Apparatus as defined in claim 9 in which said first and second lower rods are spaced laterally from said third and fourth lower rods, respectively, whereby a first notch is defined between said first and third lower rods and a second notch is defined between said second and fourth lower rods, said upper rods being cradled in and releasably retained in said notches when the respective mirror supporting arm is swung to a storage position extending longitudinally of said tractor.

* * * * *